United States Patent
Hultèn et al.

(10) Patent No.: US 7,451,858 B2
(45) Date of Patent: Nov. 18, 2008

(54) DISC BRAKE FOR A HEAVY TRUCK AND A VEHICLE INCLUDING SUCH A DISC BRAKE

(75) Inventors: Johan Hultèn, Göteborg (SE); Ingemar Dagh, Göteborg (SE)

(73) Assignee: Volvo Lastvagnar AB, Gothenburg ( * ) Notice: Subject to any disclaimer, the term of this patent is extended or adjusted under 35 U.S.C. 154(b) by 0 days.

(21) Appl. No.: 10/605,598

(22) Filed: Oct. 10, 2003

(65) Prior Publication Data

US 2004/0129509 A1    Jul. 8, 2004

Related U.S. Application Data

(63) Continuation of application No. PCT/SE02/00698, filed on Apr. 9, 2002, now abandoned.

(30) Foreign Application Priority Data

Apr. 10, 2001    (SE) ..................... 0101252

(51) Int. Cl.
    *F16D 65/10* (2006.01)
(52) U.S. Cl. .............. 188/218 XL; 188/71.1; 188/250 R; 188/251 A
(58) Field of Classification Search .............. 188/18 A, 188/218 XL, 218 A, 71.1, 73.37, 250 R, 250 E, 188/71.5, 18 R, 251 A, 251 R, 251 M; 301/6.8
See application file for complete search history.

(56) References Cited

U.S. PATENT DOCUMENTS

| | | | |
|---|---|---|---|
| 4,792,361 A | 12/1988 | Double et al. | |
| 5,568,846 A * | 10/1996 | Dagh et al. | 188/218 XL |
| 5,855,416 A * | 1/1999 | Tasker et al. | 301/124.1 |
| 6,067,429 A | 5/2000 | Sugaya et al. | |
| 6,620,860 B2 * | 9/2003 | Okayama et al. | 523/149 |
| 2004/0129509 A1 * | 7/2004 | Hulten et al. | 188/71.1 |

FOREIGN PATENT DOCUMENTS

| | | | |
|---|---|---|---|
| DE | 004133593 A1 * | 4/1993 | |
| DE | 019507102 A1 * | 9/1996 | |
| EP | 0621829 B1 | 4/1997 | |
| GB | 2260173 A | 4/1993 | |
| JP | 06-264944 | 9/1994 | |
| WO | WO 99/19525 | * 4/1999 | |
| WO | WO 0146600 A1 | 6/2001 | |
| WO | WO 02/084138 | * 10/2002 | |

OTHER PUBLICATIONS

"The Math Forum@Drexel", Ask Dr. Math, pp. 1-10, 1994, "Segments of Circles"and "Circle Formulas", pp. 1-3.*
Office Action Mailed Feb. 29, 2008 in Japanese Patent Application No. 2002-581853.
Office Action Mailed Mar. 28, 2003 and accompanying references in corresponding Swedish Patent Application No. 0101252-5.

* cited by examiner

*Primary Examiner*—Robert A. Siconolfi
*Assistant Examiner*—Mariano Sy
(74) *Attorney, Agent, or Firm*—Novak Druce + Quigg, LLP

(57) ABSTRACT

Disc brake for a heavy vehicle having a disc-shaped rotor consisting of a cast iron alloy and a calliper supporting a brake lining which is intended to be pressed against the said rotor during braking.

18 Claims, 5 Drawing Sheets

DISC BRAKE FOR A HEAVY TRUCK AND A VEHICLE INCLUDING SUCH A DISC BRAKE

CROSS REFERENCE TO RELATED APPLICATIONS

The present application is a continuation patent application of International Application No. PCT/SE02/00698 filed 9 Apr. 2002 which was published in English pursuant to Article 21(2) of the Patent Cooperation Treaty, and which claims priority to Swedish Application No. 0101252-5 filed 10 Apr. 2001. Both applications are expressly incorporated herein by reference in their entireties.

BACKGROUND OF INVENTION

1. Technical Field

The invention relates to a disc brake for a heavy vehicle comprising a disc brake having a disc-shaped rotor consisting of a cast iron alloy and a calliper supporting a brake lining which is intended to be pressed against the said rotor during braking. More particularly, the invention relates to disc brakes intended to absorb a braking torque equal to and greater than 12 kNm, especially a braking torque between 12 and 25 kNm. These brakes are intended for heavy vehicles, by which is meant vehicles having an axle pressure in excess of 5 tons, especially vehicles having an axle pressure between 6 and 14 tons.

2. Background Art

Disc brakes are being used more and more frequently for heavy vehicles. A distinction can be drawn between two types of disc brakes for heavy vehicles, firstly hat-shaped brake discs in which a disc with radial extent is configured with a centrally situated, axially running cylindrical protrusion intended for fastening to a wheel axle, and secondly brake discs which are substantially symmetrical with respect to a plane running at right angles through the rotational axis of the brake disc and have a central bushing intended for fastening to a wheel hub. One problem with hat-shaped brake discs is that the brake disc is not supported symmetrically with respect to a plane running at right angles through the rotational axis of the brake disc, which means that the disc slants when it is heated. The effect of this is that the pressure from the brake lining is not evenly distributed over the brake, so that the brake disc is at greater risk of cracking. In order to reduce the risk of disc fracture, brake discs have therefore been produced which are substantially symmetrical with respect to a plane running at right angles through the rotational axis of the brake disc and which have a central bushing intended for fastening to a wheel hub. Such a brake disc is shown in EP 621 829. The bearing surfaces of these discs remain flat during heating, so that the pressure from the brake linings is more advantageously distributed and the risk of cracking is reduced.

A further problem with the use of brake discs is the occurrence of bandwear. Band-shaped wear is a phenomenon which occurs as a result of the contact surface between lining and rotor not being completely flat. This phenomenon is explained in greater detail below in connection with FIGS. 1a-1d of the drawing. FIG. 1a shows a disc brake 1 in cross section, in which the disc brake 1 comprises a brake lining 32 and a disc-shaped rotor 8. The brake lining 32 has a contact surface 38, which faces a corresponding contact surface 39 of the rotor 8. FIG. 1a shows a disc brake having perfectly flat surfaces. All friction pairs have, however, certain irregularities. FIG. 1b shows, on an exaggerated scale, a brake lining and a rotor which have an irregularity, contact taking place within a first region 40. The region forms a band which runs around the disc. When braking occurs, a higher pressure is generated within this region, so that the majority of the braking energy is absorbed within the region. This means that the region is heated more than adjoining regions. The effect of this is that the lining and the rotor expand, whereupon an even higher pressure is developed and the irregularity is enlarged, as shown in FIG. 1c. The first region will suffer greater wear, however, than surrounding regions, firstly because the friction pair is warmer in this region, secondly because the contact pressure is heavier. This results in the irregularity being worn down and the place of contact being shifted to another place on the brake disc, as shown in FIG. 1d.

The presence of bands gives rise to the formation of local plasticized zones, thereby producing an increased risk of cracking. The successive formation of bands to and fro between central and peripheral regions of the disc further gives rise to the risk of fatigue failure as a result of the constantly occurring load change. It has been shown that the band can move one or more times between outer edges and central sections of the disc, even during one and the same braking cycle.

One object of the invention is to provide a brake disc offering reduced occurrence of disc cracking. Another object of the invention is to provide a brake disc in which the frequency of change between different band modes is reduced.

SUMMARY OF INVENTION

The said objects of the invention are achieved according to a first embodiment of the invention having a brake disc according to the characterizing part of patent claims 1 and 9.

To aid understanding of the invention, the following theoretical background is provided: Trials have been conducted involving brake tests in a test bench for brake discs and brake linings of different proportions. Observations show that brake linings having a small radial extent, B, are less prone to cracking. An explanation of this is that the relationship between the width of the brake lining, from the inner edge of the brake lining in the radial extent to the outer edge of the brake lining in the radial extent, and a contact band formed owing to the irregularity of both disc and lining is more advantageous. This means that for a certain level of energy input to the disc brake, there is an optimal relationship between the width of the said contact or wear band w and the radial extent B of the brake lining. By radial extent is here meant the distance from the inner edge of the brake lining in the radial extent to the outer edge.

We introduce a relationship $\gamma=B/R$, in which B is constituted by the radial extent of the brake lining and R is the radius of the disc. In the tests which $\gamma$ have been conducted, $\gamma=0.42$ for the wide lining and $\gamma=0.37$ for the narrow lining. The test showed that the narrow lining obtained a 33% longer working life, despite the fact that the disc was 3.8 kg lighter, which is negative from the cracking aspect since the disc becomes warmer.

The test shows that the occurrence of disc cracking can partially be explained by the aforementioned phenomenon of band-shaped wear. Cracks are formed as a result of the stresses which arise in respect of each separate band mode which occurs within the extent of the brake lining means. Usually a central mode is formed when wear occurs in a centrally situated band and a peripheral mode when wear occurs close to the edges of the lining. These stresses from these two modes are oppositely directed and therefore give rise to a load which alternates in direction. The changes of mode can arise even during a long braking cycle. The risk of fatigue failure is therefore high. One object of the invention is therefore to reduce the width of the brake lining means such that the likelihood of two separate brake modes arising is lessened. If the radial extent of the lining is of the same order of magnitude as the band, the risk of occurrence of two separate band modes is reduced. If, on the other hand, the radial extent of the brake lining means is too small, the wear on the lining means and the disc brake means will become too great, adversely affecting the working life.

One object of the invention is therefore to reduce the occurrence of cracking on the brake discs. This is performed by reducing the likelihood of bandwear occurring in a plurality of modes. This is achieved by maximizing the width of the band-shaped wear zone in relation to the radial extent B of the brake lining. Maximizing the width w of the band-shaped wear zone is equivalent to maximizing the time derivative of the width. We therefore have the following two equations:

$$\max(w/B) \quad (1)$$

$$\max((\delta w/\delta t)/B) \quad (2)$$

The width w of the band-shaped wear zone is dependent on the following material parameters: the E modulus of the lining, thermal expansion of lining and disc, thermal conduction of lining and disc and wear resistance of lining and disc. These parameters are kept constant during the following analysis, in which the geometric characteristics of lining and disc are investigated.

For a given material, the width w of the band-shaped wear zone is a function of supplied energy to the disc brake at a given radius of the brake disc. The analysis makes use of the following two hypotheses:

The rate of growth of the band is proportional to the power input:

$$\delta w/\delta t \sim P \quad (H1)$$

The rate of growth of the active area $A_{act}$ in which contact exists between lining and brake disc is proportional to the power $$\delta A_{act}/\delta t \sim P \quad (H2)$$

We have the following relationship between active area and the band width $$A_{act} = 2\pi r w \quad (3)$$

We thus obtain the following:

$$\delta A_{act}/\delta t = 2\pi r \delta w/\delta t \quad (4)$$

Which means that $$\delta w/\delta t \sim P/R \quad (5)$$

As a consequence of the above-stated hypotheses, we obtain, together with equation 2), $\max(\delta w/\delta t)/B$) and hypothesis H1, if brake power is constant:

$$\max(1/B) \quad (6)$$

Together with hypothesis H2, we obtain $$\max(1/RB). \quad (7)$$

The analysis therefore reveals that, in order to obtain a minimal risk of occurrence of changes between band modes, according to hypothesis H1 the radial extent B of the lining should be made as small as possible and, for hypothesis H2, the radial extent B of the lining and the radius R of the brake disc should be made as small as possible.

Brake discs are configured so as to be able to absorb and carry off the heat which is generated in braking. This means that the volume of the brake disc is substantially proportional to the axle pressure of the vehicle. This means that smaller discs are required for lower axle pressure and that the width w of the band-shaped wear zone decreases for reduced axle pressure.

BRIEF DESCRIPTION OF DRAWINGS

The invention will be described in greater detail below with reference to the appended figures of the drawing, in which.

DETAILED DESCRIPTION

Figure 1A:
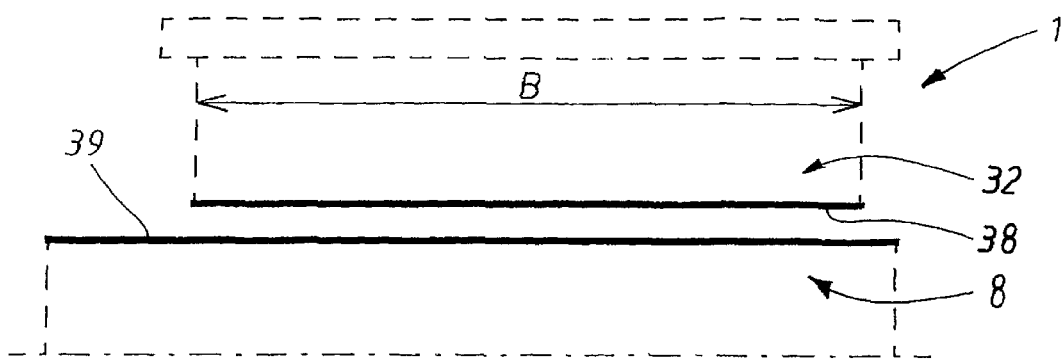
FIG. 1a shows in diagrammatic representation the cross section of a brake disc and a brake lining having perfectly flat surfaces.
Figure 1B:
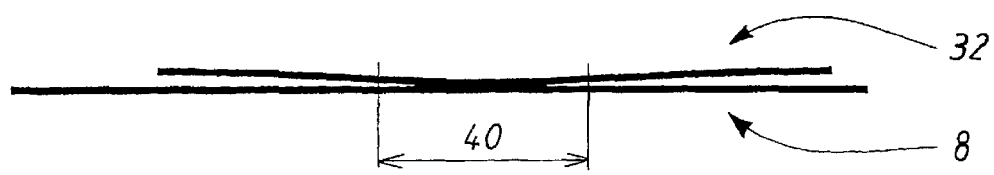
FIG. 1b shows in diagrammatic representation the cross section of a brake disc and a brake lining having an irregularity in which initial contact takes place.
Figure 1C:
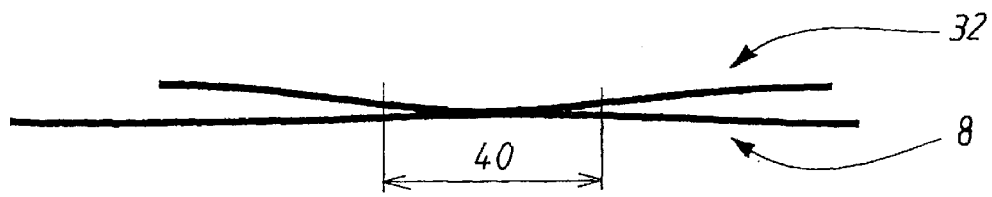
FIG. 1c shows in diagrammatic representation the growth of the irregularity during thermal expansion of disc and lining.
Figure 1D:
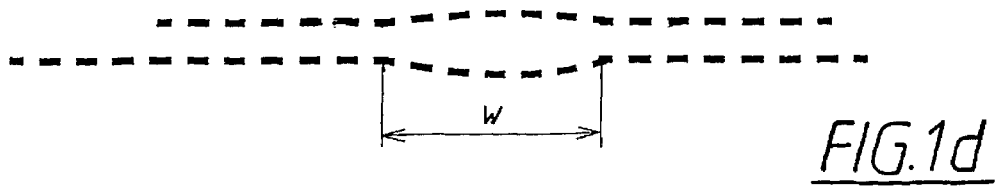
FIG. 1d shows in diagrammatic representation a band-shaped, wornregion of the irregularity.
Figure 2:
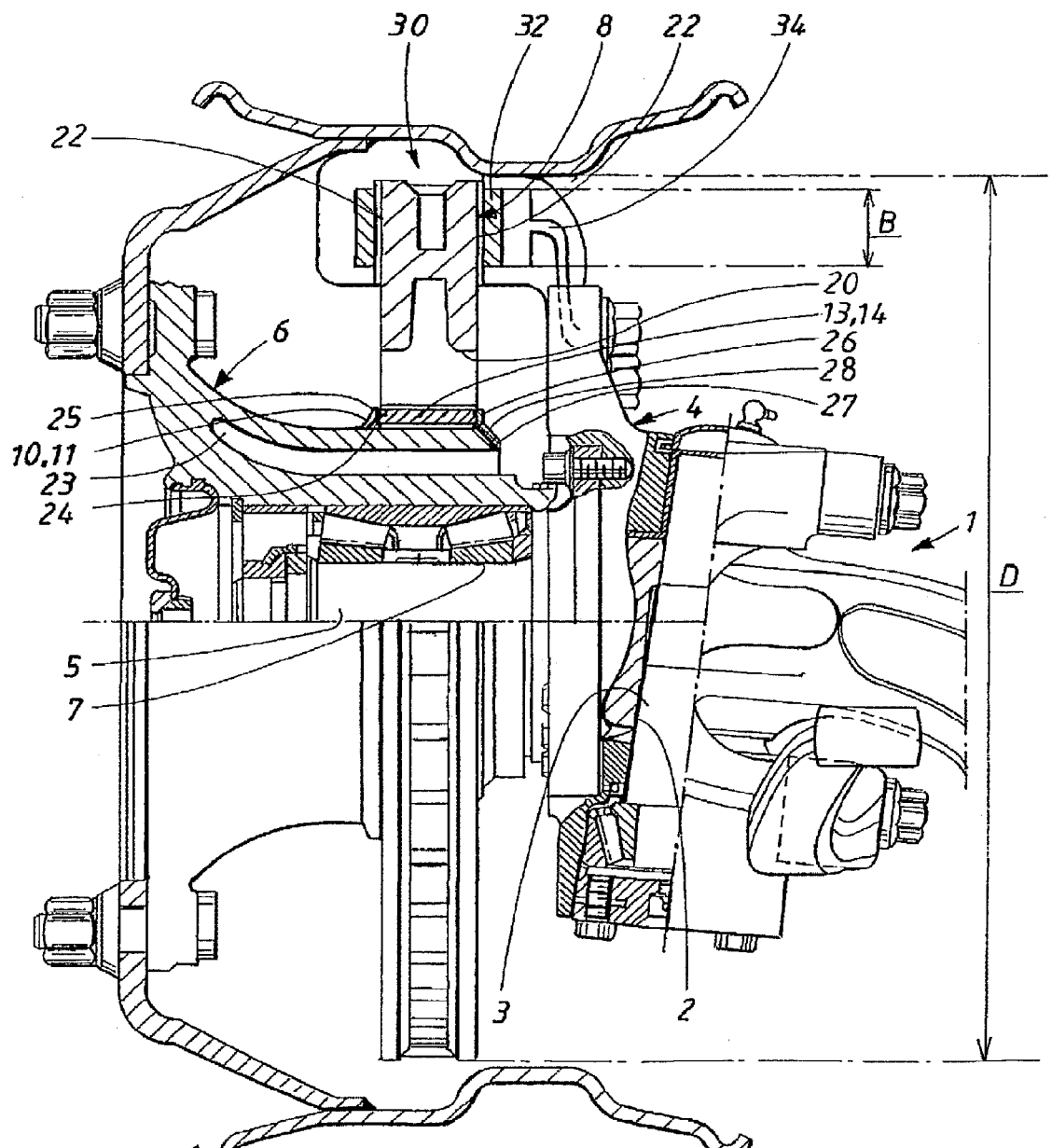
FIG. 2 shows a partially cut side view of a wheel spindle having a hub and brake disc device.
Figure 3:
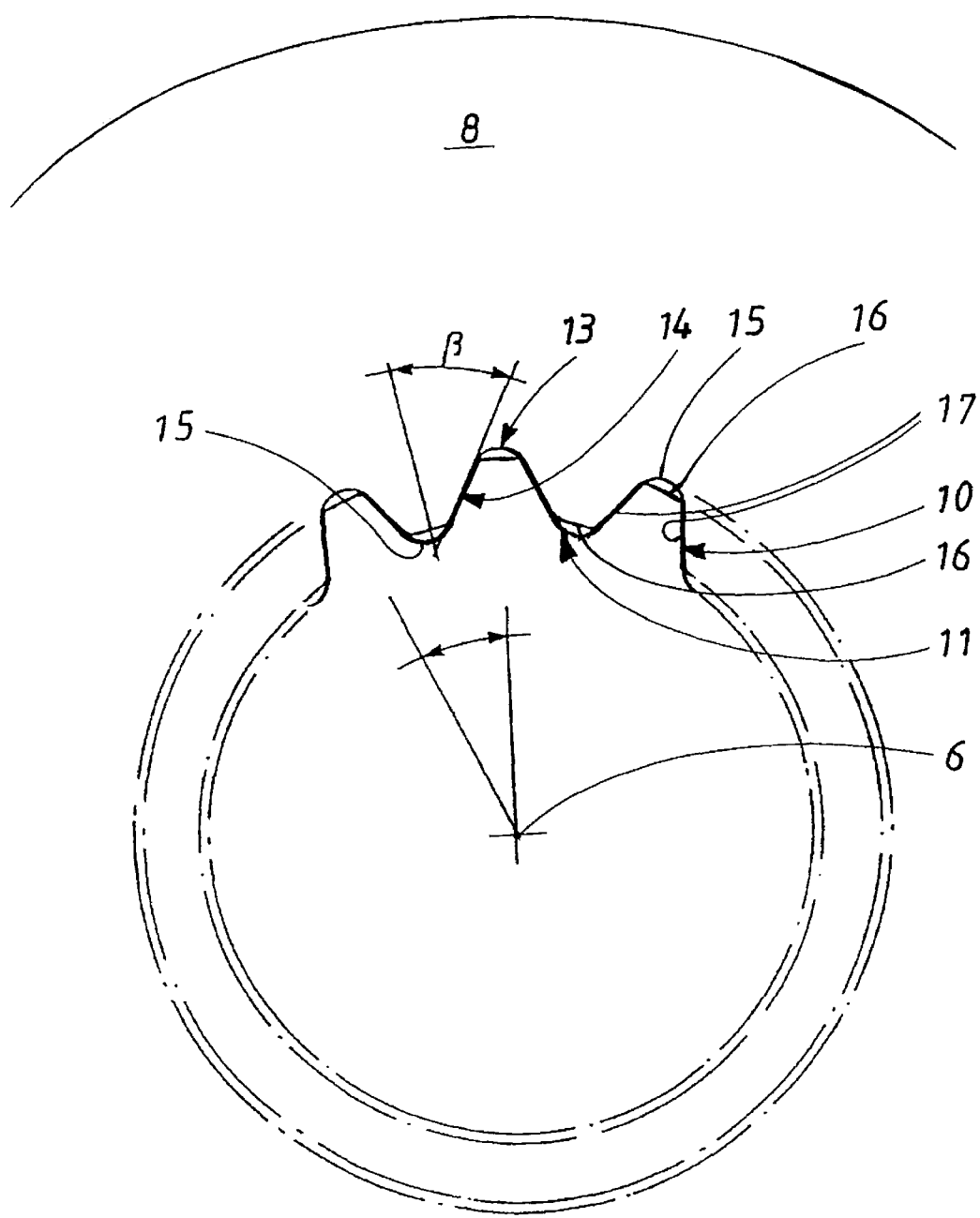
FIG. 3 shows an end view of the brake disc in FIG. 2.
Figure 4:
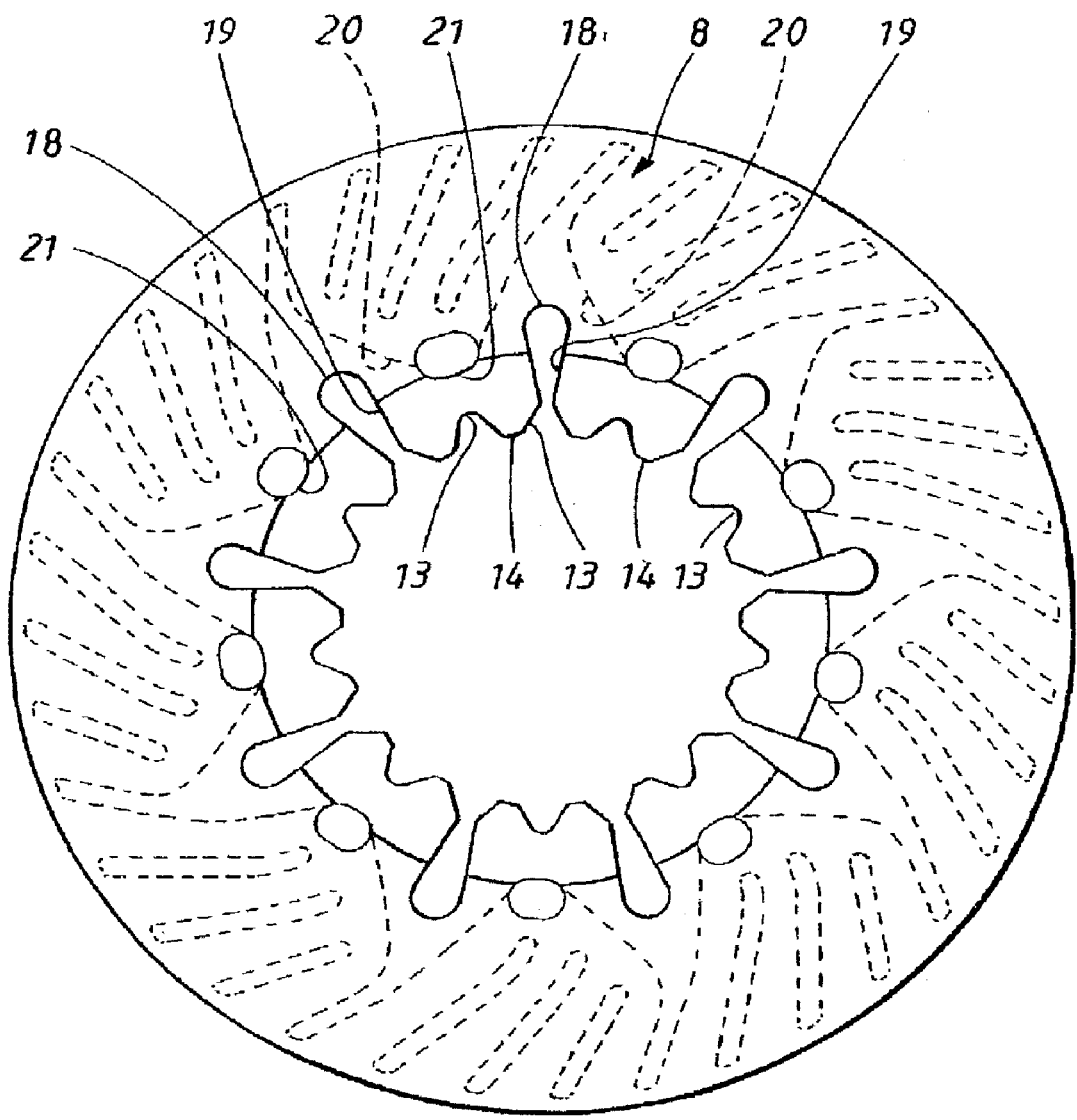
FIG. 4 shows a diagrammatic end view of a part of the hub and the radially inner part of the disc.

FIGS. 2-4 show a preferred embodiment of the invention with reference to illustrative embodiments shown in the appended drawings, in which FIG. 2 shows a partially cut side view of a wheel spindle having a hub and brake disc device according to the invention, FIG. 3 shows an end view of the brake disc in FIG. 2 and FIG. 4 shows a diagrammatic end view of a part of the hub and the radially inner part of the disc.

In FIG. 2, 1 denotes an outer end of a rigid front axle of a lorry. The axle end has a conical bore 2, in which a king pin 3 is fixed. Pivotably mounted on the king pin 3 is a spindle unit 4. The spindle unit 4 comprises an axle journal unit 5, on which a wheel hub 6 is mounted via a unit bearing 7. The hub 6 supports a brake disc 8 and the spindle unit 4 supports a brake calliper 30. The brake calliper 30 is conventional in type and comprises a brake lining 32 and members 34 for applying the brake lining 32 to the brake disc. These members are configured in a way which is familiar to the person skilled in the art, for example as hydraulically driven brake cylinders which act directly against the back plate of the brake lining or as an eccentric cam which acts against the back plate of the brake lining.

The brake disc has an active diameter D, which stretches from the centre of the brake disc to the point of contact between lining and brake disc lying at the greatest distance from the said centre. The brake lining has a radial extent B, which is the distance from the points of contact between lining and disc lying closest to the centre to those lying farthest from the centre. In determining the radial extent B of the brake lining, this measurement is defined as the mean value of the distance between the inner and outer radial periphery 36, 37 of the lining along 50% of the extent of the brake lining in the angular direction φ.

Instead of fixing the brake disc to the hub by screwing the disc to a flange on the hub, as has hitherto been the norm, in the construction according to the embodiment shown in FIGS. 2-4 the disc 8 is connected to the hub 6 by positive-locking. For this purpose, the hub 6 is configured with a central section which has a cross section deviating from a regular circle. More precisely, the section is configured with elevations 10 and grooves 11, which follow closely one behind the other and are V-shaped. The radially inner hub part 12 of the brake disc 8 is configured with corresponding grooves 13 and elevations 14, which are matched to the elevations 10 and grooves 11 of the hub.

As can especially be seen from FIG. 3, the depth of the grooves 11, 13 is somewhat greater than the height of the elevations 10, 14. The grooves have a rounded bottom 15, whilst the elevations have a flat top side 16 connecting to its flat flanks 17. As a result of this construction, surface contact is ensured over the whole of the flank surface of the elevations. The disc 8 and the hub 6 are dimensioned such that, in the unstressed state, a clearance of 0.2-0.3 mm obtains between cooperating flank surfaces 17 both in the disc and in the hub. In the illustrative embodiment shown, the hub and the disc each have eighteen grooves and elevations. The depth of the grooves amounts to circa 15% of the radius of the opening 16 in the disc. If the grooves and elevations number as many as thirty, the depth of the grooves amounts to 5% of the radius. Conducted trials have revealed that the bending and shearing stresses upon the elevations 10, 14 are lowest within the range 42°-55° of the flank angle β. The stresses increase progressively as the flank angle β falls below 42°, so that the stresses where β=30° are circa 30% higher than where β=42°-55° and where β=10° circa 200% higher.

In the embodiment shown in FIGS. 2 and 3, the brake disc 8 is configured with axial bores 18, which are situated radially inside every other groove 13 and merge into slots 19, which open out in the bottom 15 of the respective radially inner groove 13. The disc shown is of the so-called ventilated type and the bores 18 with the slots 19 communicate with adjoining ventilation ducts 20 in the disc. Between the bores 18, axial bores 21 are made, which have no correspondence, however, to the slots 19. The described arrangement of bores and slots has the function of reducing the risk of the hub section of the disc rupturing when the friction section 22 of the disc becomes more heated than its radially inner hub section, which occurs in braking. In order to limit the heat transfer from the disc to other more heatcomponents than the actual hub, for example the bearing 7, when the brake disc 8 becomes heated, an annular duct 23, which is open to one side, is configured in the hub 6 radially inside the elevations 10. The heatpath through the hub material, from the disc 8 to the hub section 24 pressed tightly on the bearing 7, is thereby extended.

As can be seen from FIGS. 2 and 3, the disc 8 is fully symmetrical. It is fixed to the hub 6 by means of a locking ring 25 made in a groove 24 in the elevations 10, a spring washer 26 and a locking ring 28 made in a groove 27 in the inner end of the hub. The symmetrical configuration and the symmetrical fastening, together with the motions which the spring washer allows on the hub, result in symmetrical thermal deformation, even wearing of the friction surfaces of the disc, little risk of braking torque variations, simple assembly and little risk of cracking. This latter is further reinforced by the bores 18 having the slots 19.

Figure 5:
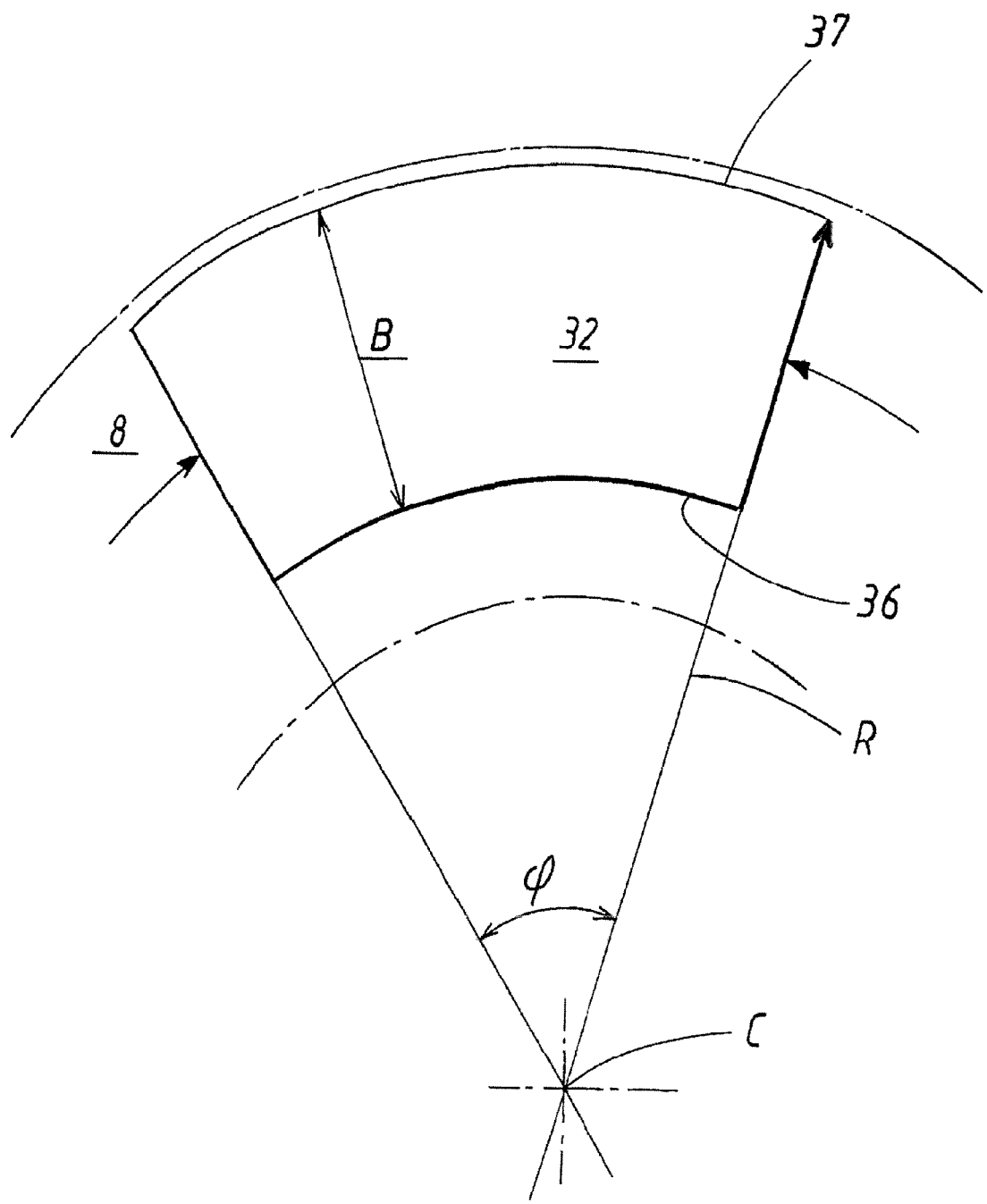
FIG. 5 shows in diagrammatic representation an end view of lining and 20brake disc.

FIG. 5 shows in diagrammatic representation part of the brake disc 8 and the brake lining 32. The brake disc 8 has an active radius R, which stretches from the centre C of the brake disc to the point of contact between lining and brake disc lying at the greatest distance from the said centre. The brake lining 32 has a radial extent B, which is the distance from the points of contact between lining and disc lying closest to the centre to those lying farthest from the centre. In determining the radial extent B of the brake lining, this measurement is defined as the mean value of the distance between the inner and outer radial periphery 36, 37 of the lining along 50% of the extent of the brake lining in the angular direction.

For heavy vehicles, it has been shown that the following measures of the radial extent are suitable for suppressing the formation of band-shaped wear zones in a plurality of modes:

| Braking torque [kNm] | Axle pressure [tonnes] | Radial extent of the brake lining [mm] |
| --- | --- | --- |
| 20-25 | 11-14 | <80 |
| 16-20 | 8.5-11 | <75 |
| 12-16 | 6-8.5 | <70 |

It has also been shown that for heavy vehicles, i.e. for vehicles having a braking torque between 12-25 kNm and/or an axle pressure between 6 14 tons, the relationship between the radial extent of the brake lining and the radius R of the brake disc B/R should be less than 0.38.

The brake discs are expediently sized according to the following table:

| Braking torque [kNm] | Axle pressure [tonnes] | Weight of the brake disc [kg] |
| --- | --- | --- |
| 20-25 | 11-14 | 22-40 |
| 16-20 | 8.5-11 | 18-36 |
| 12-16 | 6-8.5 | 15-31 |

According to a standard brake discs construction, the weight of the brake disc should be proportional to the axle load.

The brake lining is preferably configured in a rigid material having a tangential modulus of elasticity E=600 Mpa, at a contact pressure of 2 MPa and at room temperature, for brake discs intended for a braking torque of 20-25 kNm; a tangential modulus of elasticity E=500 Mpa, at a contact pressure of 2 MPa and at room temperature, for brake discs intended for a braking torque of 16-20 kNm; and a tangential modulus of elasticity E=400 Mpa, at a contact pressure of 2 MPa and at room temperature, for brake discs intended for a braking torque of 12-16 kNm.

The brake discs preferably have a diameter greater than 370 mm.

The brake discs are preferably made from a material having the following properties:

| | |
| --- | --- |
| Young's modulus | 100-150 Gpa |
| Poisson's ratio | 0.22-0.32 |
| Density | 6900-7600 kg/m$^3$ |
| Thermal capacity | 450-550 J/kgK |
| Thermal conductivity | 33-55 W/mK |
| Coefficient of thermal expansion | 10-14 I/K |

The brakes are configured with disc weights according to the table below in order to reach a temperature of less than 700° C. during a 40 s long braking cycle at a vehicle speed of 85 km/h.

| Braking torque [kNm] | Axle pressure [tonnes] | Brake disc weight [kg] |
| --- | --- | --- |
| 20-25 | 11-14 | 35 |
| 16-20 | 8.5-11 | 30 |
| 12-16 | 6-8.5 | 25 |

The invention should not be limited to the above-specified embodiments but is appropriate for use in connection with disc brakes of a wide variety of types, for example in connection with such brake discs in which the centre of the rotor is fastened to the wheel axle by an axially running cylindrical protrusion, i.e. a top-hat-shaped brake disc.

The invention claimed is:

1. Disc brake for a heavy vehicle having an axle pressure between 6 and 14 tons, comprising a disc-shaped rotor (8) consisting of a cast iron alloy and having an active radius R and a caliper (30) supporting a brake lining (32) which is intended to be pressed against said rotor (8) during braking, in which said rotor (8) and brake lining (32) are arranged to absorb a brake power corresponding to a braking torque between 12 and 25 kNm and in which said brake lining (32) has a radial extent B, characterized in that a ratio B/R between the radial extent B of the lining (32) and the active radius R of the rotor (8) is less than 0.38 and thereby substantially limiting a number of band shaped wear modes.

2. Disc brake according to claim 1, characterized in that said brake lining (32) is designed to absorb a brake power corresponding to a braking torque amounting to 16 kNm, wherein said brake lining (32) has a radial extent of less than 70 mm.

3. Disc brake according to claim 2, characterized in that said rotor (8) is of substantially symmetrical configuration with respect to a plane running at right angles through the rotational axis and has a central bushing (12) intended for fastening to a wheel axle (6), the wear surfaces of the brake disc remaining flat when heated.

4. Disc brake according to claim 2, characterized in that the active radius of the rotor (8) is greater than 185 mm.

5. Disc brake according to claim 2, characterized in that the brake lining (32) is configured having a tangential modulus of elasticity B greater than 400 Mpa at a contact pressure of 2 MPa at room temperature.

6. Disc brake according to claim 2, characterized in that said caliper (30) supports two brake cylinders which are meant to press the brake lining against the rotor.

7. Disc brake according to claim 1, characterized in that said brake lining (32) is designed to absorb a brake power corresponding to a braking torque amounting to 25 kNm, wherein said brake lining (32) has a radial extent of less than 80 mm.

8. Vehicle having an axle pressure between 6 and 14 tons, comprising a disc brake having a disc-shaped rotor (8), consisting of a cast iron alloy and having an active radius R, and a caliper (30) supporting a brake lining (32) which is intended to be pressed against said rotor (8) during braking, in which said brake lining (32) has a radial extent B, characterized in that a ratio B/R between the radial extent B of the lining (32) and the active radius R of the rotor (8) is less than 0.38 and thereby substantially limiting a number of band shaped wear modes.

9. Vehicle according to claim 8, characterized in that said axle pressure amounts to between 11 and 14 tons and in that said brake lining (32) has a radial extent of less than 80 mm.

10. Vehicle according to claim 8, characterized in that said axle pressure amounts to between 8.5 and 11 tons and in that said brake lining (32) has a radial extent of less than 75 mm.

11. Vehicle according to claim 8, characterized in that said axle pressure amounts to between 6 and 8.5 tons and in that said brake lining (32) has a radial extent of less than 70 mm.

12. A disc brake means for retarding motion of a heavy vehicle and for limiting a number of band shaped wear modes, said brake means having an axle pressure between six and fourteen tons and comprising a disc-shaped rotor (8) consisting of a cast iron alloy and having an active radius R and a caliper (30) supporting a brake lining means (32) for pressing against said rotor (8) during braking, said rotor (8) and brake lining means (32) absorbing a brake power corresponding to a braking torque between 12 and 25 kNm and said brake lining means (32) having a radial extent B and characterized in that a ratio B/R between the radial extent B of the brake lining means (32) and the active radius R of the rotor (8) is less than 0.38.

13. The disc brake means as recited in claim 12, wherein said brake lining means (32) is configured for absorbing a brake power corresponding to a braking torque amounting to 16 kNm, wherein said brake lining means (32) has a radial extent of less than 70 mm.

14. The disc brake means as recited in claim 13, wherein rotor (8) is of substantially symmetrical configuration with respect to a plane running at right angles through the rotational axis and has a central bushing means (12) for fastening to a wheel axle (6) and a wear surfaces of the brake disc remaining flat when heated.

15. The disc brake means as recited in claim 13, wherein the active radius of said rotor (8) is greater than 185 mm.

16. The disc brake means as recited in claim 13, wherein said brake lining means (32) has a tangential modulus of elasticity E greater than 400 Mpa at a contact pressure of 2 MPa at room temperature.

17. The disc brake means as recited in claim 13, wherein said caliper (30) supports two brake cylinders that press the brake lining means against the rotor.

18. The disc brake means as recited in claim 12, wherein said brake lining means (32) is configured for absorbing a brake power corresponding to a braking torque amounting to 25 kNm, wherein said brake lining means (32) has a radial extent of less than 80 mm.

* * * * *